No. 846,290. PATENTED MAR. 5, 1907.
G. W. DU BES.
SELF CLEARING CHAIN STAY FOR CAR STANDARDS.
APPLICATION FILED NOV. 9, 1906.
3 SHEETS—SHEET 1.
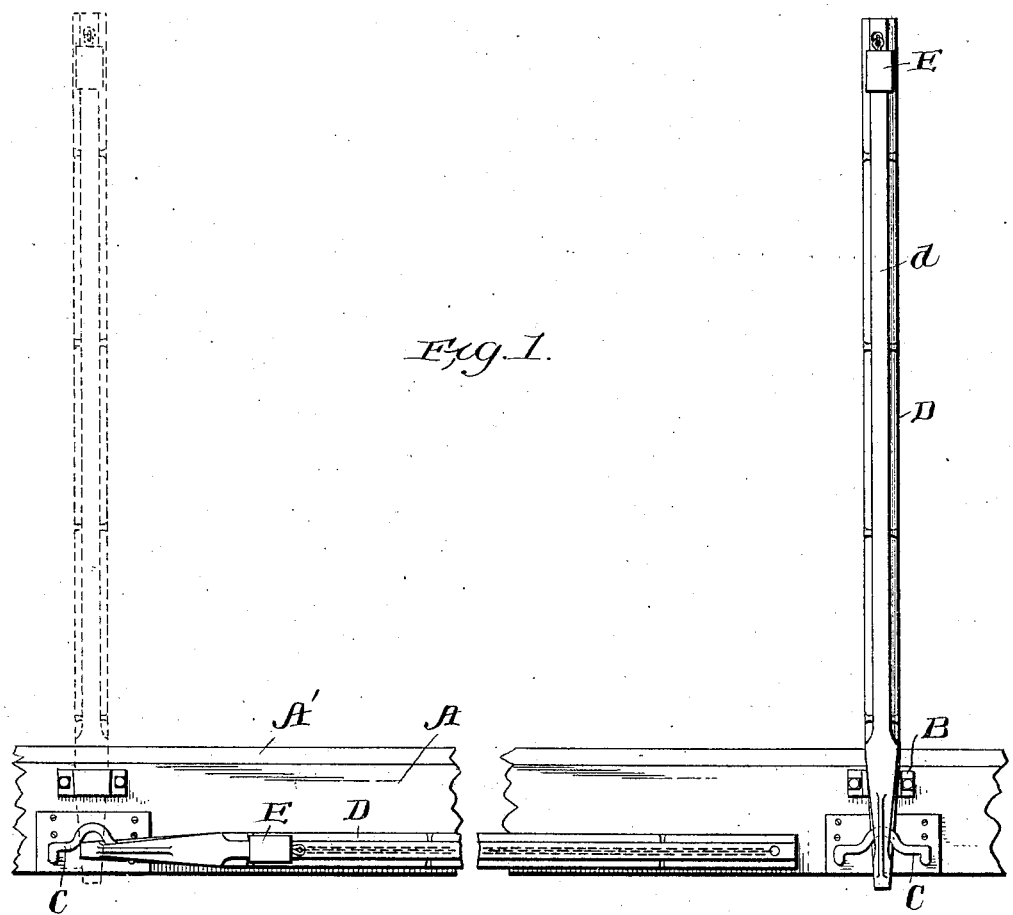
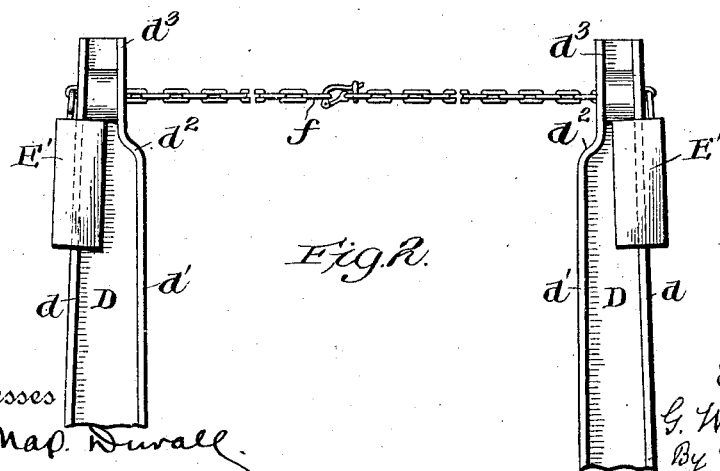

No. 846,290. PATENTED MAR. 5, 1907.
G. W. DU BES.
SELF CLEARING CHAIN STAY FOR CAR STANDARDS.
APPLICATION FILED NOV. 9, 1906.
3 SHEETS—SHEET 2.
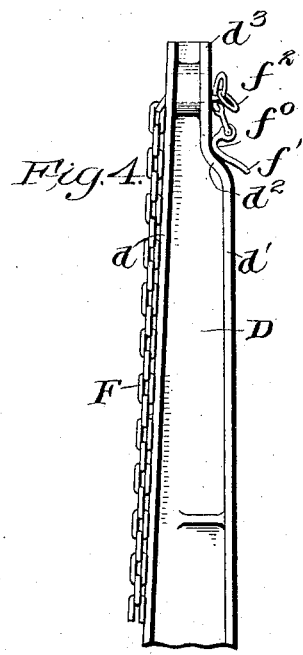
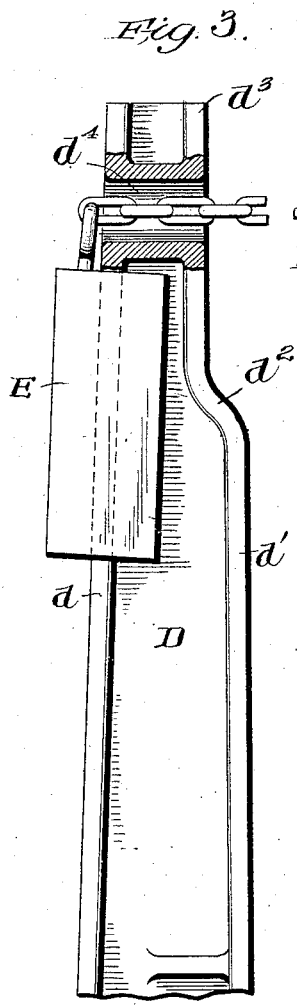
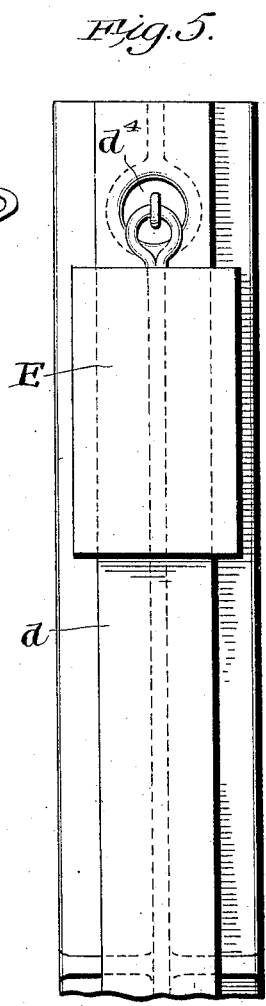
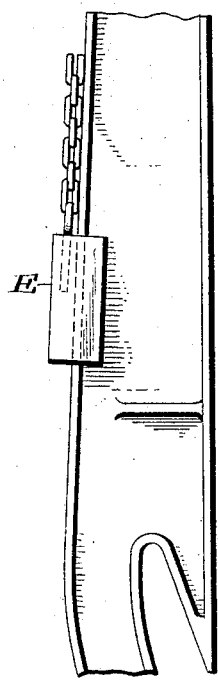
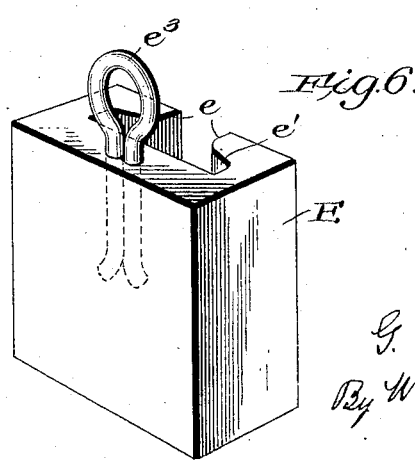
Witnesses
W. May. Duvall
E. M. Brandt
Inventor
G. W. Du Bes.
By Wilkinson & Fisher
Attorneys.

No. 846,290. PATENTED MAR. 5, 1907.
G. W. DU BES.
SELF CLEARING CHAIN STAY FOR CAR STANDARDS.
APPLICATION FILED NOV. 9, 1906.
3 SHEETS—SHEET 3.
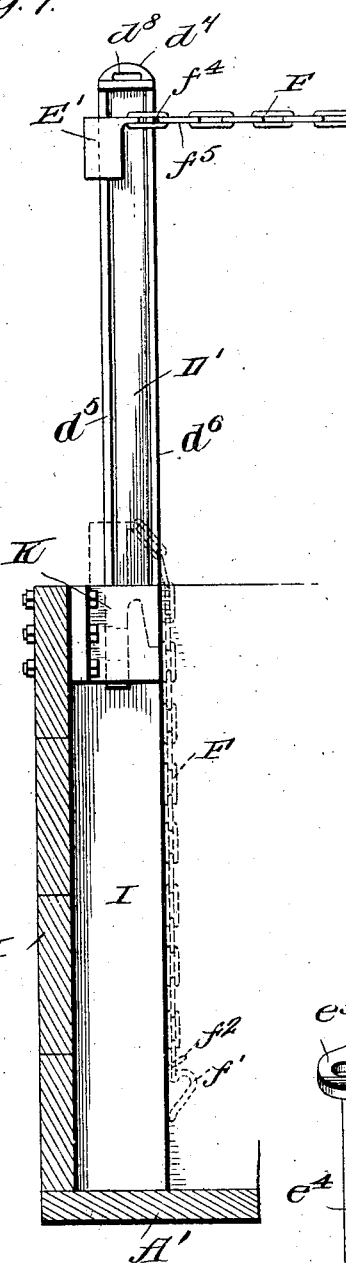
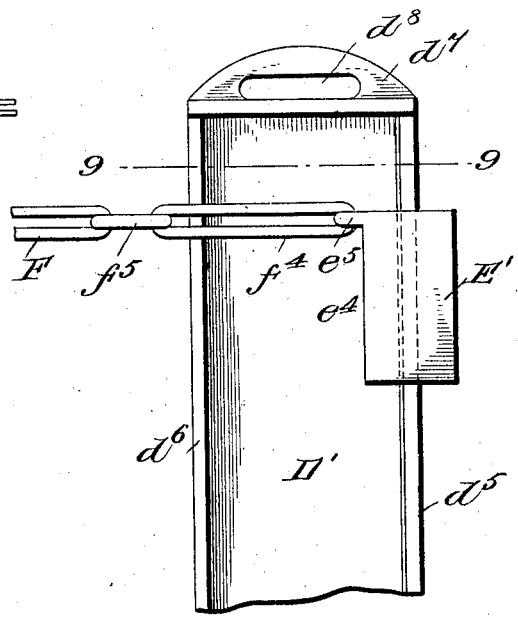
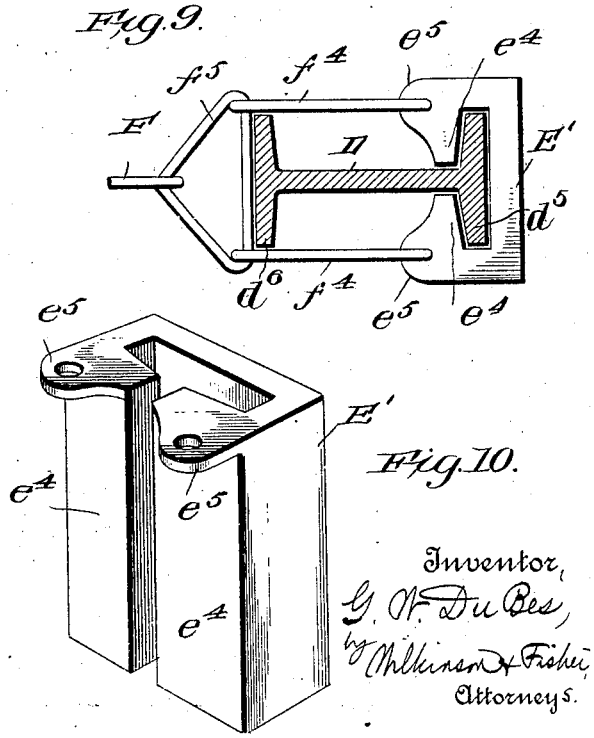
Witnesses
W. May. Duvall.
E. M. Brandt.
Inventor,
G. W. Du Bes,
by Wilkinson & Fisher,
Attorneys.

UNITED STATES PATENT OFFICE.

GEORGE W. DU BES, OF NEW ORLEANS, LOUISIANA.

SELF-CLEARING CHAIN-STAY FOR CAR-STANDARDS.

No. 846,290.          Specification of Letters Patent.          Patented March 5, 1907.

Application filed November 9, 1906. Serial No. 342,692.

*To all whom it may concern:*

Be it known that I, GEORGE W. DU BES, a citizen of the United States, residing at New Orleans, in the parish of Orleans and the State of Louisiana, have invented certain new and useful Improvements in Self-Clearing Chain-Stays for Car-Standards; and I do hereby declare the following to be a full, clear, and exact description of the invention, such as will enable others skilled in the art to which it appertains to make and use the same.

My present invention relates to improvements in self-clearing stays for car-standards; and it consists in providing automatic means whereby the chains or wire ropes used in connecting opposite standards together may be caused to automatically assume a position in which they are out of the way of the load carried by the car and are not liable to drag on the ground or to foul any parts of the running-gear of the car.

According to my invention one end of each chain or wire rope is connected to the standard by means of a sliding weight, and when the opposite end of the chain or rope is disengaged from the chain or rope from the opposite standard the weight drops down automatically, clearing the chain or rope, as will be hereinafter described.

Since "chains" are ordinarily used for stays on cars, this term alone will be used in the remainder of the specification and claims, but with the understanding that a wire rope or other suitable connector may be used instead of a chain, if desired.

My invention will be understood by reference to the accompanying drawings, in which the same parts are indicated by the same letters throughout the several views.

Figure 1 shows one end of a flat-car, with one of the standards raised and another lowered. Fig. 2 shows a section across a flat-car, showing two of the standards connected together by chain-stays. Fig. 3 is a view, on an enlarged scale, of the head of one of the standards shown in Fig. 2, with the weight in the raised position. Fig. 4 is a similar view to Fig. 3, except that the weight has dropped and part of the standard is broken away. Fig. 5 is an enlarged view of the head of the standard shown to the right of Fig. 1. Fig. 6 is a perspective view of the sliding weight shown in Figs. 1 to 5. Fig. 7 shows a portion of the body of a gondola car with its standard in the raised position and with the sliding weight elevated. Fig. 8 is an enlarged view of the head of the standard shown in Fig. 7 as seen from the opposite side of said figure. Fig. 9 is a section along the line 9 9 of Fig. 8 looking down, and Fig. 10 is a perspective view of the sliding weight shown in Figs. 7 to 9.

The car-standard shown in Figs. 1 to 5 is of generally similar construction to that illustrated and described in my application, Serial No. 339,056, filed October 15, 1906, and entitled "Improvements in car-standards," and the mode of raising and lowering the said standard and of holding the same in place in both its raised and lowered position is fully described in the application aforesaid. It will therefore be sufficient to refer to the parts very briefly.

A represents one of the side beams of the car, A' the platform, and A² one of the cross-beams. B represents the bracket in which the standard is held, and C represents the U-bolt engaging the heel of the standard, all of which are fully described in my application aforesaid.

D represents the standard, which is provided with a straight double flange $d$ on its outer edge and preferably with a double flange $d'$ on its inner edge, which is curved outward, as at $d^2$, and terminates in the lug $d^3$, perforated, as at $d^4$. (See Figs. 3 and 4.)

E represents a sliding weight, (shown in detail in Fig. 6,) which sliding weight has a substantially T-shaped slot therethrough, formed by the rectangular lugs $e$ and the curved sides $e'$. The back of the weight is also provided with lugs $e^2$, spaced apart and perforated, as at $e^0$, to receive the pin $e^3$, which engages the end of the chain F, as shown most clearly in Fig. 4.

The outer ends of each pair of chains are connected to similar weights E', as shown in Fig. 2; but the inner ends of the chains are provided with complementary fastening devices of any suitable type. I have shown an enlarged link $f$ connected to one of the chains on the hook $f'$, having an enlarged head $f^0$, and a keeper $f^2$ mounted at the end of the other chain, so that the two chains may be hooked together when the weights are in the raised position, as shown in Fig. 2.

In order to release the stays, it will only be necessary to knock back the keeper $f^2$, when the hook $f'$ will swing clear of the link $f$, and the two weights will drop to the position shown in Fig. 4. The link $f$ and the head $f^0$ of the opposite hook should be too large, respectively, to pass through the slots $d^4$ in the head of the stanchions, so that the said link and the hook will arrest the fall of the weight when the chain F has been drawn through said slot.

With the chain in the position shown in Fig. 4 the standard may be swung down to the position indicated to the left in Fig. 1, when it will be supported by the curved U-bolt C, as fully described in my application aforesaid. The shape of the head of the standard is such that the fastening device may be held in the recessed portion above the cam $d^2$, and thus clear the side of the car when swung longitudinally of the car, as shown to the left in Fig. 1.

It will be obvious that this self-clearing attachment for standard-stays may be used with other forms of flat-car standards than was described in my application aforesaid, and any convenient means may be availed of to secure the standard against the side of the car when in the lowered position. Various means for accomplishing this end are well known in the art, and it will be unnecessary to describe the same, as this does not constitute a part of my present invention.

In the form of device shown in Figs. 7 to 10, a portion of a gondola car is shown, in which A' represents the car-platform, as before, and H represents a part of the side of the car-body, having an ordinary lining-stud I, to which and to the side of the car-body the bracket K is secured, in which bracket the standard D' is mounted, as fully described in my application, Serial No. 326,915, filed July 19, 1906, and entitled "Improvements in gondola-car standards." This standard D' may be held in the raised position in said bracket, as shown in Fig. 7, or may be lowered through said bracket, as fully described in the application, Serial No. 326,915, aforesaid. This standard is preferably in the form of an I-beam, having double flanges $d^5$ and $d^6$. It is also provided with a cap $d^7$, slotted, as at $d^8$, for convenience in lifting by hand. This slot may also be used to connect an auxiliary stay to the head of the standard. On the outer flanges of the standard $d^5$ the sliding weight E' is mounted, which weight has a T-shaped slot therethrough, and the members $e^4$ of the weight are provided with lugs $e^5$, to which are connected the links $f^4$, connected to the triangle $f^5$, secured to the end of the chain F, as shown in Fig. 9. Any suitable means for fastening the other ends of the opposite stay-chains together may be adopted—such, for instance, as are shown in Fig. 2. It will be seen that as soon as the two opposite chains are released from engagement the weights E' will slide down the standards D', dragging the chains over the load on the car, if it reaches high enough, and finally allowing the chains to assume the position shown in dotted lines in Fig. 7. If the standard be lowered after the chains are released, it will slide down through the weight, which weight will be held on top of the bracket K. It will be obvious that the sliding weight shown in Figs. 7 to 10 may be used with other forms of gondola-car standards well known in the art, and as the standard proper is not a part of my present invention it will be unnecessary to describe such forms.

Having thus described my invention, what I claim, and desire to secure by Letters Patent of the United States, is—

1. In an apparatus of the character described, the combination with a car-standard, of a weight adapted to slide on said standard, and a stay-chain secured to said weight, substantially as and for the purposes described.

2. In an apparatus of the character described, the combination with a car-body provided with oppositely-disposed standards, of stay-chains for connecting the standards on opposite sides of the car, means for detachably connecting said stay-chains, and weights mounted to slide on said standards and connected to the opposite ends of said stay-chains, substantially as and for the purposes described.

3. In an apparatus of the character described, the combination with a substantially vertical standard having a guide-flange thereon, of a weight mounted to slide on said guide-flange, and a chain having one end secured to said weight and being provided with a fastening device at the other end, substantially as described.

4. In an apparatus of the character described, the combination with two oppositely-disposed standards, each provided with a guide-flange on the outer edge thereof, of a weight mounted to slide on each guide-flange, a chain connected to the upper part of said weight, and means for detachably connecting the opposite chains, substantially as described.

5. In an apparatus of the character described, the combination with a car-standard provided with a slot in its head, of a weight adapted to slide on said standard, and a stay-chain passing through said slot in said standard and secured to said weight, substantially as and for the purposes described.

6. In an apparatus of the character described, the combination with a car-body provided with oppositely-disposed standards, each having a slot in its head, of stay-chains passing through said slots for connecting the standards on opposite sides of the car, means for detachably connecting said stay-chains, and weights mounted to slide on said standards and connected to the opposite ends of said stay-chains, substantially as and for the purposes described.

7. In an apparatus of the character described, the combination with a substantially vertical standard having a guide-flange thereon and having a slot in its head, of a weight mounted to slide on said guide-flange, and a chain rove through said slot and having one end secured to said weight and being provided with a fastening device at the other end, substantially as described.

8. In an apparatus of the character described, the combination with two oppositely-disposed standards, each having a slot in its head and each provided with a guide-flange on the outer edge thereof, of a weight mounted to slide on each guide-flange, a chain rove through said slot and connected to the upper part of said weight, and means for detachably connecting the opposite chains, substantially as described.

9. In an apparatus of the character described, the combination with a car-standard provided with a slot in its head, of a weight adapted to slide on said standard, and a stay-chain passing through said slot in said standard and secured at one end to said weight, and having a device at the other end too large to pass through said slot, substantially as and for the purposes described.

10. In an apparatus of the character described, the combination with a car-body provided with oppositely-disposed standards, each having a slot in its head, of stay-chains rove through said slots for connecting the standards on opposite sides of the car, means for detachably connecting said stay-chains, each of larger diameter than said slots, and weights mounted to slide on said standards and connected to the opposite ends of said stay-chains, substantially as and for the purposes described.

11. In an apparatus of the character described, the combination with a substantially vertical standard having a guide-flange thereon and having a slot in its head, of a weight mounted to slide on said guide-flange, and a chain rove through said slot and having one end secured to said weight and being provided with a fastening device at the other end, of larger diameter than said slot, substantially as described.

12. In an apparatus of the character described, the combination with two oppositely-disposed standards, each having a slot in its head and each provided with a guide-flange on the outer edge thereof, of a weight mounted to slide on each guide-flange, a chain rove through said slot and connected to the upper part of said weight, a stopper for preventing the free end of the chain from passing through the slot, and means for detachably connecting the opposite chains, substantially as described.

In testimony whereof I affix my signature in presence of two witnesses.

GEORGE W. DU BES.

Witnesses:
  GEO. HESS,
  ANDREW HERD.